United States Patent
Graaf et al.

(10) Patent No.: US 10,059,169 B2
(45) Date of Patent: Aug. 28, 2018

(54) ASSEMBLY FOR COLLECTING AND REMOVING LEAKED REFRIGERANT

(71) Applicant: MAHLE International GmbH, Stuttgart (DE)

(72) Inventors: Juergen Graaf, Stuttgart (DE); Moritz Loens, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 15/593,659

(22) Filed: May 12, 2017

(65) Prior Publication Data

US 2017/0349028 A1    Dec. 7, 2017

(30) Foreign Application Priority Data

Jun. 6, 2016  (DE) .......................... 10 2016 209 931

(51) Int. Cl.
*B60H 1/00* (2006.01)
*F25B 9/00* (2006.01)
*B60H 1/32* (2006.01)

(52) U.S. Cl.
CPC ....... *B60H 1/00978* (2013.01); *B60H 1/3225* (2013.01); *F25B 9/008* (2013.01)

(58) Field of Classification Search
CPC .............. B60H 1/00978; B60H 1/3225; B60H 1/00364; B60H 1/00885; B60H 1/00985; B60H 2001/3261; B60H 2001/3263; F25B 9/008; F25B 41/04; F25B 41/043; F25B 49/005; F25B 2500/19; F25B 2500/222; F25B 2700/2104; F25B 2700/21174; F25B 2700/211175
(Continued)

(56) References Cited

U.S. PATENT DOCUMENTS 4,492,361 A    1/1985  Jacquet et al.
7,080,522 B2 *  7/2006  Taira .................... B60H 1/3217
                                              62/244
(Continued)

FOREIGN PATENT DOCUMENTS

DE          32 27 458      2/1983
DE    10 2005 007 687 A1   8/2006
(Continued)

*Primary Examiner* — Mohammad M Ali
(74) *Attorney, Agent, or Firm* — Muncy, Geissler, Olds & Lowe, P.C.

(57) ABSTRACT

An assembly for collecting and removing leaked refrigerant, in particular from an evaporator of an air conditioning system of a motor vehicle and/or from a periphery, provided for the refrigerant, of the evaporator with a housing part for the air-tight surrounding of at least one refrigerant connection and/or at least one section of a refrigerant line, and with a connection element, whereby the attachment element has at least one first attachment opening and a second attachment opening, whereby the first connection opening is fluidically connected to the housing part by a channel element and the second connection opening can be fluidically connected to an outlet channel opening into the surroundings such that the refrigerant leaked within the housing part can be fed into the first channel element and can be discharged into the surroundings via the connection element and the outlet channel.

15 Claims, 2 Drawing Sheets

(58) Field of Classification Search
USPC .......................................................... 62/149
See application file for complete search history.

(56) References Cited

U.S. PATENT DOCUMENTS

| | | | | |
|---|---|---|---|---|
| 8,595,953 | B2* | 12/2013 | Lee ....................... | D06F 58/206 |
| | | | | 34/413 |
| 8,695,404 | B2* | 4/2014 | Kadle ................ | B60H 1/00978 |
| | | | | 73/49.2 |
| 8,912,694 | B2* | 12/2014 | Miura ....................... | H02K 5/20 |
| | | | | 310/54 |
| 2015/0192127 | A1* | 7/2015 | Nagano ............... | F04C 18/0261 |
| | | | | 417/410.5 |

FOREIGN PATENT DOCUMENTS

| | | |
|---|---|---|
| DE | 10 2005 048 988 A1 | 4/2007 |
| DE | 10 2008 005 171 A1 | 7/2009 |
| DE | 10 2009 037 556 A1 | 2/2011 |

\* cited by examiner

ASSEMBLY FOR COLLECTING AND REMOVING LEAKED REFRIGERANT

This nonprovisional application claims priority under 35 U.S.C. § 119(a) to German Patent Application No. 10 2016 209 931.0, which was filed in Germany on Jun. 6, 2016, and which is herein incorporated by reference.

BACKGROUND OF THE INVENTION

Field of the Invention

The invention relates to an assembly for collecting and removing leaked refrigerant, in particular from an evaporator of an air conditioning system of a motor vehicle and/or from an evaporator periphery provided for the refrigerant.

Description of the Background Art

DE 32 27 458 A1, which corresponds to U.S. Pat. No. 4,492,361, discloses an air conditioning system for air conditioning the interior of a vehicle by supplying conditioned air. This system has an evaporator, located in the airflow and integrated into a refrigerant circuit operated with $CO_2$ as the refrigerant, a blocking element, located in the airflow downstream of the evaporator, for blocking the air supply to the interior, and an air exhaust opening, located in the airflow upstream of the blocking element and open to the vehicle surroundings at least in the case of a blocked air supply to the interior. To optimize an air conditioning system operated with carbon dioxide as the refrigerant and in regard to low fabrication costs and safety in the case of malfunction of the refrigerant circuit, the blocking element is made as a control element for adjusting the partial airflows, flowing through a heat exchanger and a bypass, both disposed in the airflow direction downstream of the blocking element.

A condensate drain below the evaporator, which is located in a cold air chamber enclosed by the evaporator and the control element, is used as an air exhaust opening when the air supply is blocked by the control element.

The known devices and methods for preventing a refrigerant concentration, injurious to the health of vehicle occupants, in the vehicle cabin by refrigerant escaping due to leakage from the refrigerant circuit of an air conditioning system do in fact offer advantages, but should be improved still further with respect to their usability and safety. This is primarily important because $CO_2$, which is odorless and injurious to health starting at a certain concentration in breathing air, is used increasingly as the refrigerant in air conditioning systems for motor vehicles.

SUMMARY OF THE INVENTION

It is therefore an object of the invention to provide an assembly for collecting and removing leaked refrigerant, the use of which prevents in a reliable manner vehicle occupants from being exposed to an elevated refrigerant concentration due to a leaking refrigerant.

An exemplary embodiment of the invention relates to an assembly for collecting and removing leaked refrigerant, in particular from an evaporator of an air conditioning system of a motor vehicle and/or from an evaporator periphery provided for the refrigerant, with a housing part for the air-tight surrounding of at least one refrigerant connection and/or at least one section of a refrigerant line, and with a connection element, whereby the connection element has at least one first connection opening and a second connection opening, whereby the first connection opening is fluidically connected to the housing part by means of a channel element and the second connection opening can be fluidically connected to an outlet channel opening into the surroundings, in particular of the motor vehicle, in such a way that the refrigerant, leaked within the housing part, can be fed into the first channel element and can be discharged into the surroundings via the connection element and the outlet channel. Leaked and/or leaking refrigerant can be captured and discharged into the surroundings by means of an assembly of this kind without rather high structural costs and with a very low excess use of valuable installation space.

It is provided in an exemplary embodiment that the outlet channel can be a condensate drain of a housing of the air conditioning system. Outlet channels acting as a condensate drain are already provided as a standard feature in many air conditioning system housings. For this reason, the condensate drain is suitable for use as an outlet channel.

An embodiment provides that the connection element can have a third connection opening which can be fluidically connected to a condensate collecting element of the air conditioning system. A condensate drain, which can be connected to the condensate collecting element, and the connection element can be combined into a single part in this way.

In an exemplary embodiment, the connection element can be integrated into a frame part and/or a bottom part and/or the condensate collecting element and/or connected to the frame part and/or the bottom part and/or the condensate collecting element and/or formed integrally with the frame part and/or the bottom part and/or the condensate collecting element. The number of parts to be assembled during the assembly of the air conditioning system can be reduced further in this way, as a result of which the manufacturing cost is reduced.

The channel element can be made as, for example, a flexible hose and/or as a plastic tube. These are cost-effective in mass production and easy to install.

Moreover, the channel element can have a first connecting element at a first end, facing away from the housing part, and the connection element can have in the area of the first connection opening a second connecting element, corresponding to the first connecting element, in such a way that the first end of the channel element can be connected to the first connection opening of the connection element. This facilitates the assembly and leads to a robust connection of the channel element to the connection element.

An exemplary embodiment provides that at least one retaining element can be located at a first side, facing the connection element, of the condensate collecting element, whereby the channel element can be inserted or pressed into the at least one retaining element and is secured in the retaining element in particular against a translation occurring parallel to the first side of the condensate collecting element and in a first direction facing away from the connection element. An unintentional loosening of the channel element from the connection element is prevented in this way. Moreover, errors during mounting of the channel element on the connection element are avoided.

In an exemplary embodiment, the channel element in the area of its first end can have two radially formed webs circumferentially, whereby the webs of the channel element, inserted in the retaining element, protrude parallel to the first side of the condensate collecting element on both sides from the circumference of the channel element, whereby the webs in each case have an outer edge, facing away from the channel element, and a bearing edge, substantially facing away from the first end of the channel element, whereby the retaining element, located at the first side of the condensate collecting element, has at least two projections and/or fins protruding from the first side of the condensate collecting element, whereby the distance between the two projections and/or fins is smaller than the distance between the outer edges of the webs such that the bearing edges of both webs of the channel element, inserted in the retaining element, are supported in the first direction against one of the projections and/or against one of the fins.

In an embodiment, the housing part can be made as two parts from a first housing part half and a second housing part half, whereby the two housing part halves can be connected substantially air-tight to one another. This facilitates the attachment of the housing part to the refrigerant connections and/or refrigerant lines.

An embodiment provides that the housing part can enclose a refrigerant connection, connected to the evaporator, and/or refrigerant lines for conveying the refrigerant.

Advantageously, the second connection opening of the connection element can have a discharge fitting, whereby a hose that can be connected to the outlet channel and/or a tube that can be connected to the outlet channel is/are disposed at the discharge fitting. This facilitates the removal of condensate and leaked refrigerant, in particular into the surroundings of the motor vehicle.

An exemplary embodiment provides that a first plane, formed by the opening surface of the first connection opening of the connection element, can be disposed substantially perpendicular to a second plane, formed by the opening surface of the second connection opening of the connection element. As a result, the connection element can be made as an angle piece that can be produced cost-effectively.

In an embodiment, the condensate collecting element can engage below the evaporator on at least one side of the evaporator and in addition can have a discharge opening, which is fluidically connected to the third connection opening of the connection element.

An exemplary embodiment provides that the housing part can be connected to the housing of the air conditioning system. This saves installation space and increases the efficiency of the assembly of the invention.

Advantageously, the connection element in an installed position of the evaporator and when viewed relative to the bottom of the motor vehicle can be disposed below the evaporator and/or at an evaporator bottom side substantially facing the bottom of the motor vehicle. This is a typical installation position for a condensate collecting element at the evaporator, because the condensate can be collected especially effectively here due to gravity.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION

Figure 1:
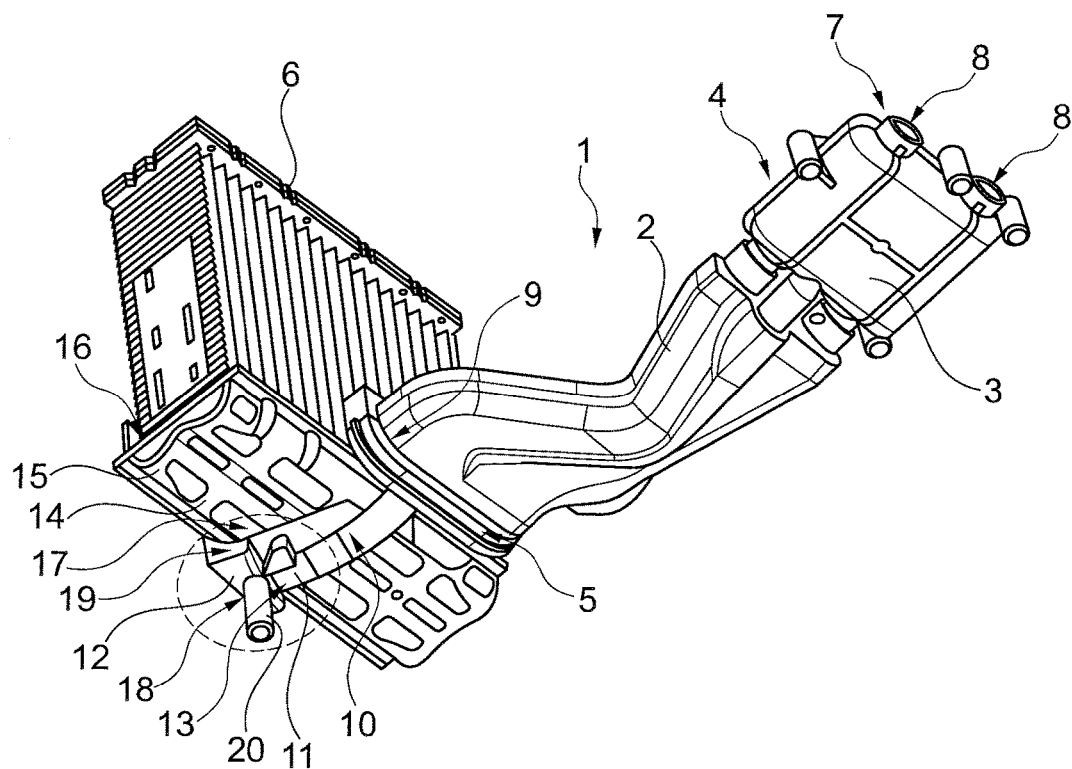
FIG. 1 shows a perspective view of an assembly of the invention.

FIG. 1 shows an exemplary embodiment of an assembly 1 of the invention for collecting and removing refrigerant that has leaked out of a refrigerant circuit. The refrigerant is preferably the known refrigerant $CO_2$. In alternative designs, however, the refrigerant can also be a refrigerant other than $CO_2$ or a mixture of different substances. Assembly 1 is preferably disposed in an air conditioning system of a motor vehicle or in the periphery of an air conditioning system of a motor vehicle. The phrase "periphery of the air conditioning system" refers to the vicinity of the air conditioning system, in particular, but not exclusively, in the area of a front wall of the motor vehicle. A front wall of this kind, which is not shown in greater detail in FIG. 1, divides the motor vehicle into an engine compartment located at the front side of the front wall and a vehicle cabin compartment located at the rear of the front wall. Assembly 1 can be disposed on both sides of the front wall or extend through the front wall.

Assembly 1 has a housing part 2. Housing part 2 can be made integrally with an air conditioning system housing, not shown in greater detail in FIG. 1, or be connected to the air conditioning system housing. Alternatively, housing part 2 can also be placed in the air conditioning system housing or extend through a section of the wall of the air conditioning system housing.

Housing part 2 is made as two parts from two housing part halves 3, 4 formed, for example, symmetric to one another, namely, from a first housing part half 3 and a second housing part half 4. Because of the viewing direction selected for FIG. 1, only the first housing half is shown in detail in FIG. 1. Housing halves 3, 4 alternatively can also be formed asymmetric to one another and have any desired outer contours.

The two housing part halves 3, 4 are located next to one another at a mutual partition plane and can be connected together substantially air-tight, for example, by a tongue-and-groove connection. Alternatively, other material, frictional, and/or positively locking connections and/or methods can also be used to join the two housing halves 3, 4. Moreover, housing part 2 can also be made as a single piece or have more than two assembled parts. So as to make the connection substantially air-tight, a sealing element, not shown in greater detail in FIG. 1 and, for example, positioned circumferentially, can be placed on housing part 2, particularly in the area of the partition plane.

Housing part 2 has a refrigerant connection 5, which is connected fluidically to an evaporator 6 of the air conditioning system. The refrigerant can be fed into and/or removed from evaporator 6 via refrigerant connection 5. Housing part 2 surrounds or encloses refrigerant connection 5 in a substantially air-tight manner. For this purpose, housing part 2 in particular embodiments can adjoin substantially air-tight evaporator 6 in the area of a refrigerant connection located at evaporator 6 or enclose substantially air-tight a refrigerant connection located at evaporator 6. Refrigerant lines 8 are placed within housing part 2 between refrigerant connection 5 and a first end 7, substantially facing away from evaporator 6, of housing part 2. These refrigerant lines 8 as well are surrounded substantially air-tight by housing part 2. In alternative embodiments, refrigerant lines 8 can also be absent or be made shorter or longer. In this regard, the length and direction of the extent of housing part 2 can vary. Refrigerant lines 8 and refrigerant connection 5 are integrated into the air conditioning system refrigerant circuit, which is not shown in greater detail in FIG. 1.

If a leak, from which the refrigerant escapes from the refrigerant circuit, forms in the area of refrigerant connection 5, surrounded or enclosed substantially air-tight by housing part 2, and/or refrigerant lines 8, surrounded or enclosed substantially air-tight by housing part 2, the leaked refrigerant is retained or initially collected within housing part 2, closed air-tight outwardly.

Housing part 2 is fluidically connected to a channel element 10 at a second end 9 of housing part 2, said second end being opposite to first end 7 of housing part 2. The refrigerant, retained or initially collected housing part 2, can be removed from housing part 2 by channel element 10. Alternatively, housing part 2 can also be fluidically connected to channel element 10 at a position located elsewhere on housing part 2.

Channel element 10 is formed, for example, as a flexible hose. Alternatively, channel element 10 can also be formed, for example, as a rigid plastic tube. In this case, channel element 10 can be formed integrally with housing part 2 or be connected to housing part 2 by means of material, frictional, and/or positive-lock and/or methods.

Channel element 10 is fluidically connected at its first end 11, facing away from housing part 2, to a first connection opening 13 of a connection element 12. To connect channel element 10 to connection element 12, channel element 10 has at least one first connecting element in the area of its first end 11. Connection element 12 in the area of first connection opening 13 has a second connecting element corresponding to the first connecting element. First end 11 of channel element 10 is connected fluid-tight to first connection opening 13 by means of the two connecting elements. As an alternative to a fluid-tight connection of first end 11 of channel element 10 to first connection opening 13, said connection being made by connecting elements, first end 11 of channel element 10 and first connection opening 13 of connection element 12 can also be connected fluid-tight to one another by means of other material, frictional, and/or positive-lock and/or methods.

Connection element 12 is fluidically connected fixedly to housing part 2 in this way via first connection opening 13 and channel element 10. In this regard, connection element 12 is connected to a first side 14, facing away from evaporator 6, of a condensate collecting element 15, located at evaporator 6 and/or at the housing of the air conditioning system. Condensate collecting element 15 in the exemplary embodiment shown in FIG. 1 is disposed on a first side 16, facing connection element 12, of evaporator 6. In an exemplary installation position of the air conditioning system and when viewed relative to the bottom of the motor vehicle, first side 16 of evaporator 6 forms a bottom side of evaporator 6, said bottom side substantially facing the bottom of the motor vehicle. Condensate collecting element 15 is formed substantially in form of a tray, whose side walls engage below first side 16 of evaporator 6. As a result, the condensate formed at evaporator 6 can drain, facilitated by gravity, into condensate collecting element 15, formed as a tray, and be collected there.

Condensate collecting element 15 has at least one discharge opening 17 on its first side 14, which corresponds to the bottom of the tray formed by condensate collecting element 15. The condensate collected in condensate collecting element 15 can be removed from evaporator 6 via discharge opening 17.

Connection element 12 has, in addition to first connection opening 13, which is fluidically connected to first end 11 of channel element 10, a second connection opening 18 and a third connection opening 19. In the exemplary embodiment shown in FIG. 1, the first plane, formed by the opening surface of first connection opening 13, is disposed substantially perpendicular to the second plane, formed by the opening surface of second connection opening 18. In this case, second connection opening 18 is located on a side, substantially facing away from condensate collecting element 15, of connection element 12. Alternatively, first connection opening 13 and second connection opening 18 can also be located, positioned differently to one another, at connection element 12.

Third connection opening 19 in the exemplary embodiment shown in FIG. 1 is located opposite to second connection opening 18 or at a side, facing condensate collecting element 15, of connection element 12. In this case, second connection opening 18 is fluidically connected to discharge opening 17 of condensate collecting element 15.

Second connection opening 18 in the exemplary embodiment shown in FIG. 1 has a discharge fitting 20 disposed substantially perpendicular to the longitudinal axis of channel element 10. Third connection opening 19 is fluidically connected, for example, to an air conditioning system condensate drain, which opens into a condensate discharge opening, located typically, but not necessarily, in the bottom of the motor vehicle. For this purpose, a hose that can be connected to the condensate drain or a tube that can be connected to the condensate drain can be located at discharge fitting 20 located in the area of third connection opening 19. Moreover, third connection opening 19, connection element 12, and/or the channel element 10 can also be fluidically connected to a different outlet channel, whereby said different outlet channel preferably opens into the surroundings of the air conditioning system and/or into the surroundings of the motor vehicle.

Condensate collecting element 15 is preferably connected to a frame part of evaporator 6, for example, by clipping, in the area of first side 16 of evaporator 6. Alternatively, condensate collecting element 15 can also be formed integrally with a frame part of evaporator 6 or evaporator 6. Moreover, condensate collecting element 15 can also be connected to the housing of the air conditioning system and be formed as part of the housing of the air conditioning system or integrally with it.

Connection element 12 is preferably formed as a tubular angle piece, whereby first connection opening 13 and second connection opening 18 are located at opposite ends of the tubular angle piece and third connection opening 19 is located in the area of the angle of the angle piece. In this regard, connection element 12 can be integrated into condensate collecting element 15, the frame part, or a bottom part of evaporator 6, be connected to these, and/or be formed integrally with these. In alternative exemplary embodiments, connection element 12 can also located at a position farther removed from evaporator 6. Third connection opening 19 at connection element 12 can also be absent. In this case, connection element 12 is fluidically connected to housing part 2 via first connection opening 13 and channel element 10 and via second connection opening 18 to the condensate drain of the air conditioning system or to a different outlet channel. In this regard, connection element 12 can be formed, for example, also as an extension of channel element 10, said extension formed integrally with channel element 10. In this case, first connection opening 13 substantially forms a cross-sectional segment of channel element 10.

Figure 2:
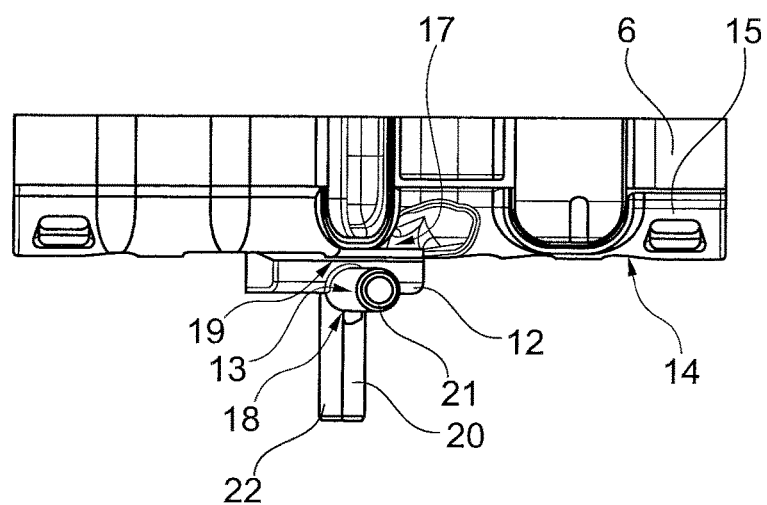
FIG. 2 shows a side perspective view of a detail of an assembly according to FIG. 1.

FIG. 2 shows a detail of assembly 1 according to FIG. 1. A side view of a section of condensate collecting element 15 is shown. Connection element 12 is located on first side 14, facing away from evaporator 6, of condensate collecting element 15. Connection element 12, for example, has two tubular connection pieces 21, 22, disposed at a right angle to one another, a first connection piece 21, located at first connection opening 13, and a second connection piece 22, located at second connection opening 18. First connection piece 21, for example, has the aforementioned second connecting element, which can be connected to the first connecting element, located at the first end of the channel element shown in FIG. 1, to form a fluid-tight connecting of the channel element to connection element 12.

Second connection piece 22 is formed as the aforementioned discharge fitting 20.

Third connection opening 19 is located opposite to second connection opening 18 or at the side, facing condensate collecting element 15, of connection element 12. In this case, second connection opening 18 is fluidically connected to discharge opening 17 of condensate collecting element 15.

Figure 3:
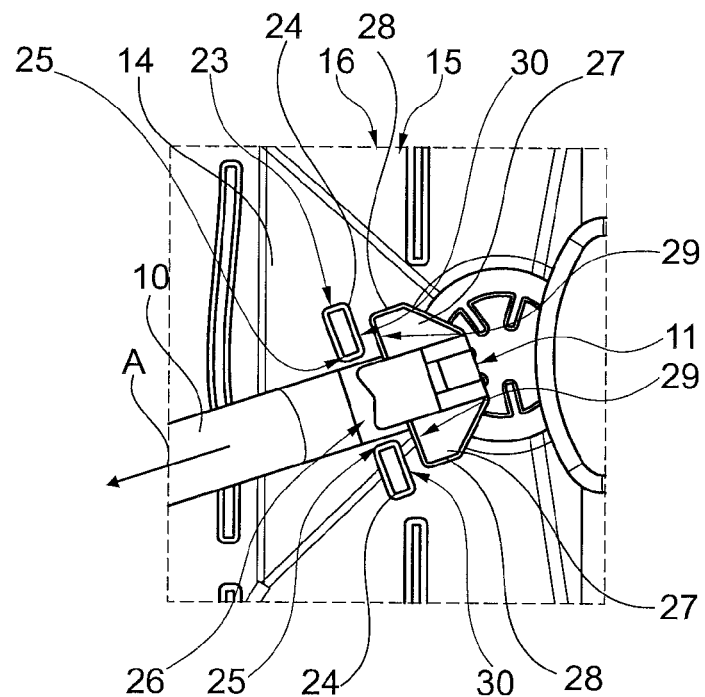
FIG. 3 shows a schematic view of a detail of an assembly according to FIG. 1.

FIG. 3 shows a view, taken perpendicular to first side 14 of condensate collecting element 15, of a further detail of the assembly according to FIG. 1. A retaining element 23 is located at first side 14 of condensate collecting element 15. Retaining element 23, for example, has two fins 24 arranged adjacent to one another. Fins 24 each have a first fin end 25. Fins 24 are arranged adjacent to one another such that both fin ends 25 face one another and form a gap 26. The dimensioning of gap 26 or the distance between the two fin ends 25 is formed such that channel element 10 can be inserted and/or pressed in between the two fin ends 25 or into gap 26. In this case, the distance between the two fin ends 25 can be made somewhat smaller than the circumferential diameter of channel element 10. Channel element 10 can be connected frictionally to retaining element 23 in this way by pressing channel element 10 into retaining element 23. In alternative embodiments, retaining element 23 can have, instead of longitudinally formed fins 24, projections as well which are formed compact and which are arranged accordingly spaced apart from one another and between which channel element 10 can be inserted or pressed in. Moreover, more than one retaining element 23 can be disposed at first side 14 of condensate collecting element 15.

First channel element 10 at its first end 11 has two wing-shaped webs 27, which have an outer edge 28, tapering toward to first end 11 of channel element 10, and a bearing edge 29, perpendicular to the longitudinal direction of channel element 10 and facing away from first end 11 of channel element 10. The distance between the two outer edges 28 is, for example, about twice as large as the distance between the two fin ends 25. If a tensile force acts on channel element 10 in the first direction, shown schematically in FIG. 3 by the arrow labeled with letter A, bearing edges 29 of webs 27 are braced against a first fin side 30, facing webs 27, of fins 24. An undesired loosening of channel element 10 from connection element is prevented in this way.

Fins 24 and/or webs 27 can be made of an elastomeric material, as a result of which the connecting of channel element 10 to retaining element 23 is facilitated.

Figure 4:
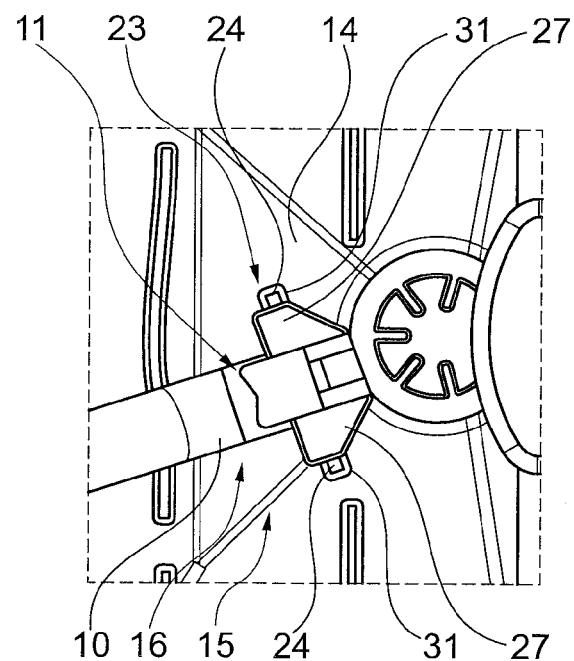
FIG. 4 shows a schematic view of a further detail of an assembly according to FIG. 1.

FIG. 4 shows the detail, already shown in FIG. 3, of the assembly according to FIG. 1. In this case, channel element 10 is shown in an assembled position incorrectly connected to the first connection opening. In this case, webs 27 lie on upper edge 31, facing away from first side 14 of condensate collecting element 15, of fins 24. Channel element 10 in the area of its first end 11 protrudes further from first side 14 of condensate collecting element 15 than is the case in a correct connection of channel element 10 to the first connection opening. As a result, the mounting of parts to be mounted in the area of the connection element is hampered and the incorrect connection of channel element 10 and the first connection opening of the connection element can be detected by the installer. This helps in preventing errors during the blind assembly of channel element 10 on the connection element, which otherwise could lead to the entry of the refrigerant into the vehicle cabin.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An assembly for collecting and removing leaked refrigerant from an evaporator of an air conditioning system of a motor vehicle or from an area provided for a refrigerant of the evaporator, the assembly comprising:
    a housing part that air-tight surrounds at least one refrigerant connection and/or at least one section of a refrigerant line; and
    a connection element that has at least one first connection opening and a second connection opening, the first connection opening being fluidically connected to the housing part via a channel element and the second connection opening being fluidically connected to an outlet channel opening into an external surround such that the refrigerant that is leaked within the housing part is directed into the first channel element and discharged into the external surroundings via the connection element and the outlet channel.

2. The assembly according to claim 1, wherein the outlet channel is a condensate drain of a housing of an air conditioning system.

3. The assembly according to claim 1, wherein the connection element has a third connection opening that is fluidically connected to a condensate collecting element of the air conditioning system housing.

4. The assembly according to claim 3, wherein the connection element is integrated into a frame part and/or a bottom part and/or the condensate collecting element and/or connected to the frame part and/or the bottom part and/or the condensate collecting element and/or formed integrally with the frame part and/or the bottom part and/or the condensate collecting element.

5. The assembly according to claim 1, wherein the channel element is a flexible hose and/or a plastic tube.

6. The assembly according to claim 1, wherein the channel element has a first connecting element at a first end facing away from the housing part, and wherein the connection element, in an area of the first connection opening, has a second connecting element corresponding to the first connecting element such that the first end of the channel element is connected to the first connection opening of the connection element.

7. The assembly according to claim 1, wherein at least a retaining element is disposed at a first side facing the connection element of the condensate collecting element, and wherein the channel element is inserted or pressed into the at least one retaining element and is secured in the retaining element against a translation occurring parallel to the first side of the condensate collecting element and in a first direction A facing away from the connection element.

8. The assembly according to claim 7, wherein the channel element in an area of its first end has two radially formed webs circumferentially, wherein the webs of the channel element inserted in the retaining element protrude substantially parallel to the first side of the condensate collecting element on both sides from the circumference of the channel element, wherein the webs have an outer edge facing away from the channel element and a bearing edge substantially facing away from the first end of the channel element, wherein the retaining element located at the first side of the condensate collecting element has at least two projections and/or fins protruding from the first side of the condensate collecting element, and wherein a distance between the two projections and/or fins is smaller than a distance between the outer edges of the webs such that the bearing edges of both webs of the channel element inserted in the retaining element are supported in the first direction A against one of the projections and/or against one of the fins.

9. The assembly according to claim 1, wherein the housing part is formed from a first housing part half and a second housing part half, and wherein the first and second housing part halves are connected substantially air-tight to one another.

10. The assembly according to claim 1, wherein the housing part encloses a refrigerant connection connected to the evaporator and/or refrigerant lines for conveying the refrigerant.

11. The assembly according to claim 1, wherein the second connection opening of the connection element has a discharge fitting, and wherein a hose connectable to the outlet channel and/or a tube connectable to the outlet channel are disposed at the discharge fitting.

12. The assembly according to claim 1, wherein a first plane formed by an opening surface of the first connection opening of the connection element is disposed substantially perpendicular to a second plane formed by an opening surface of the second connection opening of the connection element.

13. The assembly according to claim 1, wherein the condensate collecting element engages below the evaporator on at least one first side of the evaporator and has a discharge opening that is fluidically connected to the third connection opening of the connection element.

14. The assembly according to claim 1, wherein the housing part is connected to the housing of the air conditioning system.

15. The assembly according to claim 1, wherein the connection element, in an installed position of the evaporator and when viewed relative to the bottom of the motor vehicle, is disposed below the evaporator and/or at a bottom side substantially facing the bottom of the evaporator.

* * * * *